(12) United States Patent
Hirst

(10) Patent No.: US 6,181,895 B1
(45) Date of Patent: Jan. 30, 2001

(54) IMAGE FORMING DEVICES, IMAGE FORMING METHODS, AND METHODS OF SUPPLYING POWER TO AN IMAGE FORMING DEVICE

(75) Inventor: B. Mark Hirst, Boise, ID (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/435,137

(22) Filed: Nov. 5, 1999

(51) Int. Cl.⁷ .................................................. G03G 15/00
(52) U.S. Cl. ................................ 399/88; 399/37
(58) Field of Search ...................... 399/36, 37, 70, 399/85, 88, 89; 307/18, 43; 323/207

(56) References Cited

U.S. PATENT DOCUMENTS 5,809,369 * 9/1998 Furuya et al. .......................... 399/70
5,862,437 * 1/1999 Kutsuwada et al. ................... 399/88

* cited by examiner

Primary Examiner—Arthur T. Grimley
Assistant Examiner—Hoang Ngo

(57) ABSTRACT

The present invention provides image forming devices, image forming methods, and methods of supplying power to an image forming device. According to one aspect of the invention, an image forming device includes an input adapted to couple with an external power source; electrical circuitry configured to provide images; a first power supply coupled with the input and configured to supply electricity from the input to the electrical circuitry; and a second power supply coupled with the input and configured to supply electricity from the input to the electrical circuitry; wherein the electrical circuitry is configured to control the supply of electricity from the first power supply and the second power supply.

18 Claims, 5 Drawing Sheets

IMAGE FORMING DEVICES, IMAGE FORMING METHODS, AND METHODS OF SUPPLYING POWER TO AN IMAGE FORMING DEVICE

FIELD OF THE INVENTION

The invention relates to image forming devices, image forming methods, and methods of supplying power to an image forming device.

BACKGROUND OF THE INVENTION

Document preparation has become increasingly sophisticated in recent years. Conventional image forming devices, such as laser printers, ink jet printers, facsimile devices, etc., have continued to evolve to provide advances including increased throughput, improved imaging and increased efficiencies.

Conventional printer configurations are typically coupled with a host computer system, or alternatively, with numerous host computer systems via a network. The host computer system(s) is configured to interface with the appropriate printer. The host computer system may be arranged to download a print job to the printer via an associated connection. Some conventional printers are configured to parse the incoming data, to rasterize the data, and to print an image corresponding to the data.

Such conventional arrangements provide a driver, such as a page description language (PDL) driver, within the host computer system. Exemplary page description languages include PCL and Postscript. The associated printer includes a parser which is configured to operate in conjunction with the appropriate page description language driver of the host computer system. The attached printer may have plural page description language parsers for use with multiple drivers.

Following processing within the appropriate page description language parser, the received data is rasterized and applied to the print engine of the printer. Thereafter, imaging of the data upon media is usually performed.

Conventional printers and other image forming devices typically individually include a DC converter coupled with an external AC power source. The DC power supplies common in conventional printer configurations may individually enjoy an approximate 80% efficiency rating at normal operational levels and loads.

However, it is attractive to provide power save modes of operation for printers and other image forming devices during extended periods of inactivity. Such power save modes are modes wherein some components of the image forming devices are shut down to provide reduced power consumption. The efficiencies of typical DC power supplies may drop from approximately 80% at the normal operating levels to less than 50% at such low power levels. The drop in efficiency is due to switching and conduction losses in switches as well as losses in the snubbers and magnetic circuits in conventional DC power supply configurations. Accordingly, such image forming devices operate in a relatively inefficient manner during the power save mode of operation.

New regulations issued by the Environmental Protection Agency (EPA), such as Energy Star limitations, impose stricter power save mode power consumption levels for printers and other image forming devices. Conventional printers and other imaging forming devices will have great difficulty in meeting these new limits as well as stricter limits in the future due to the above inefficiencies.

Therefore, there exists a need to provide devices and methodologies providing increased efficiencies.

SUMMARY OF THE INVENTION

The invention provides image forming devices, image forming methods, and methods of supplying power to an image forming device.

According to one aspect of the invention, an image forming device comprises: an input adapted to couple with an external power source; electrical circuitry configured to provide images; a first power supply coupled with the input and configured to supply electricity from the input to the electrical circuitry; and a second power supply coupled with the input and configured to supply electricity from the input to the electrical circuitry; wherein the electrical circuitry is configured to control the supply of electricity from the first power supply and the second power supply.

A second aspect of the invention provides an image forming method comprising: providing an image forming device including electrical circuitry; forming an image using the electrical circuitry; receiving electricity from an external power source within the image forming device; supplying the electricity to the electrical circuitry using at least one of a first power supply and a second power supply; and controlling the supplying via at least one of the first power supply and the second power supply.

Another aspect of the invention provides a method of supplying power to an image forming device comprising: providing an image forming device having electrical circuitry configured to provide images, an input adapted to couple with an external power source, and a first power supply and a second power supply individually coupled with the input and the electrical circuitry; operating the image forming device in a plurality of operational modes; first supplying electricity to the electrical circuitry using the first power supply during operating in one of the operational modes; and second supplying electricity to the electrical circuitry using the second power supply during operating in another of the operational modes.

Other features and advantages of the invention will become apparent to those of ordinary skill in the art upon review of the following detailed description, claims, and drawings.

DETAILED DESCRIPTION OF THE INVENTION

Figure 1:
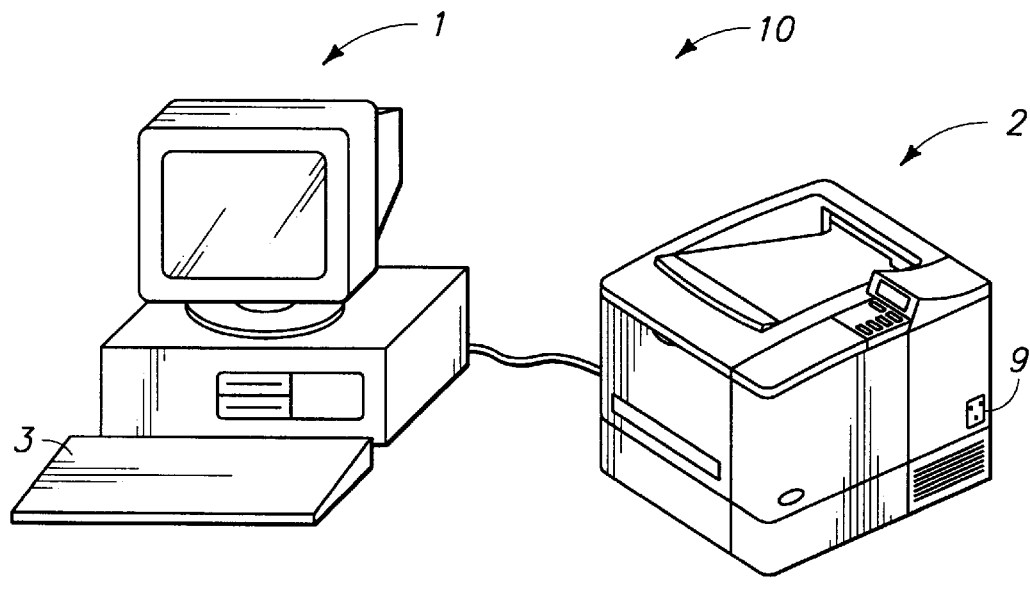
FIG. 1 is an illustrative representation of an exemplary image forming system.

Referring to FIG. 1, an exemplary image forming system 10 is shown. The depicted image forming system 10 includes a host computer 1 and an image forming device 2. Host computer 1 and image forming device 2 are coupled via a parallel connection in the described embodiment. The illustrated image forming device 2 includes an input 9 configured to connect with an external power source, such as a local utility.

Host computer 1 is configured as a personal computer (PC) in the depicted arrangement. The described host computer 1 includes a processor, such as a Pentium (TM) processor, available from Intel Corporation.

The depicted image forming device 2 comprises a printer, such as a laser printer or an ink jet printer. The present invention is not limited to the disclosed printer arrangement but is also applicable to other image forming devices. Exemplary alternative image forming devices 2 include facsimile devices, copiers, Mopiers (TM), other multiple function peripheral devices, etc.

Host computer 1 of the depicted arrangement includes a user interface 3 comprising a keyboard. A user of image forming system 10 inputs original data, edit data and commands via user interface 3. Exemplary data includes word processor data. The data may be retrieved from memory within host computer 1, retrieved from a network (not shown), created or entered by the user, etc.

Figure 2:
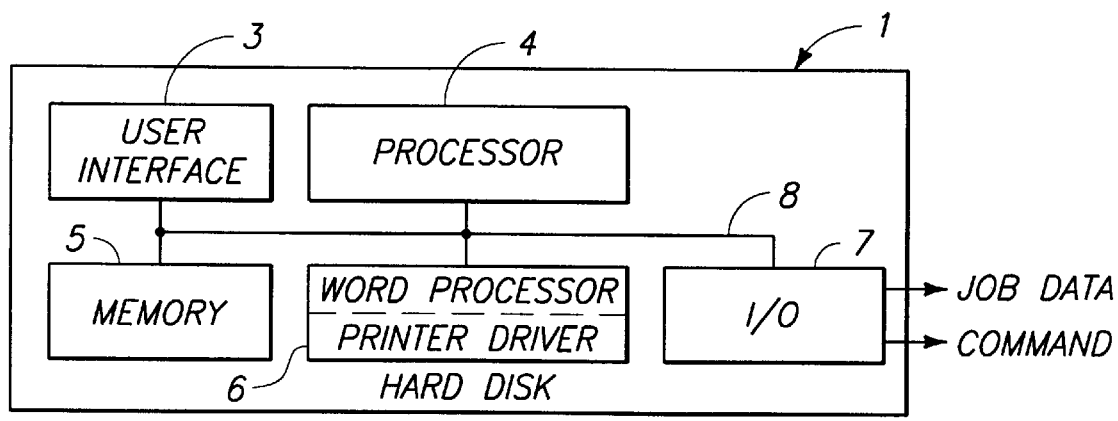
FIG. 2 is a functional block diagram of an exemplary host computer of the image forming system.

Referring to FIG. 2, the depicted host computer 1 includes a user interface 3, a processor 4, a memory 5, a hard disk 6, an input/output (I/O) port 7 and a bus 8. Bus 8 operates to interconnect components 3–7.

Processor 4 is configured to control operations of host computer 1 responsive to executable instructions. For example, hard disk 6 stores initial boot instructions, word processor instructions and printer driver instructions for execution by processor 4. Hard disk 6 is also configured to store documents comprising original data. Responsive to appropriate key strokes via user interface 3, processor 4 executes an application, such as a word processor, to provide desired image creation and editing.

Appropriate portions of an executed application may be temporarily stored within memory 5 which includes read access memory (RAM) and read only memory (ROM) in the described configuration. During execution of the appropriate word processing application, a user may input commands via user interface 3. Such commands can be implemented to initiate the formation of images within image forming device 2 as described below.

Figure 3:
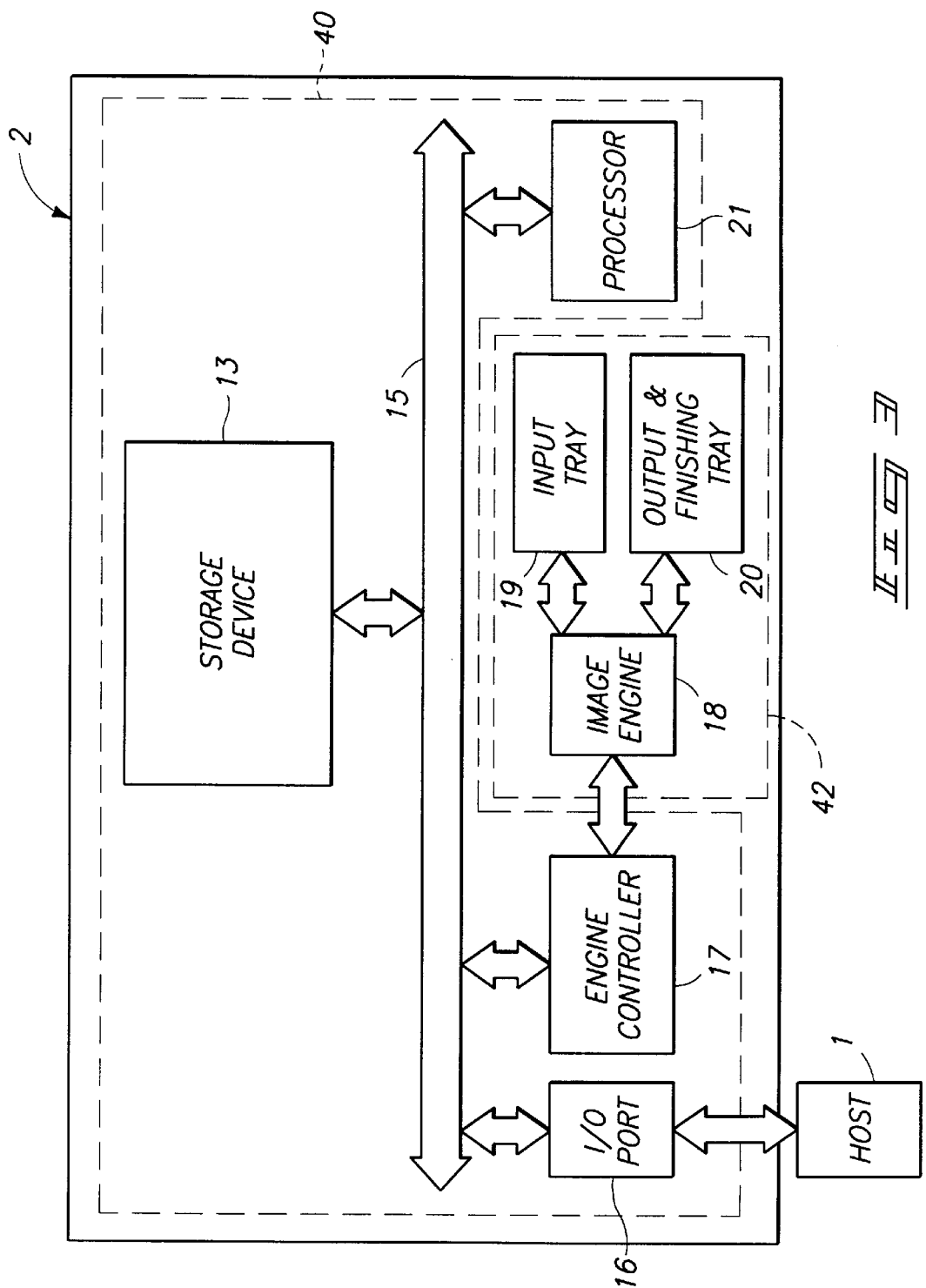
FIG. 3 is a functional block diagram of an exemplary image forming device of the image forming system.

Referring to FIG. 3, the depicted embodiment of image forming device 2 comprises at least one storage device 13 including a hard disk storage device, a single-in-line-memory module (SIMM) device, a random access memory (RAM) device, and/or a read only memory (ROM) device. Individual storage devices 13 are coupled with a bus 15. Image forming device 2 also comprises electrical circuitry including at least one of logic circuitry 40 and imaging circuitry 42. Other configurations of image forming device 2 are possible.

Logic circuitry 40 of the disclosed electrical circuitry is configured to control the supply of power from a power source (e.g., utility line) to the electrical circuitry of image forming device 2 as described in further detail below. Logic circuitry 40 includes digital logic circuit components in the described embodiment. Such can include processors, memory components, controllers, etc. For example, in the described arrangement, logic circuitry 40 includes storage device 13, an input/output (I/O) port 16, an engine controller 17 and a processor 21. Logic circuitry 40 is coupled with a power supply which provides a fixed voltage reference such as 5 Volts or 3.3 Volts. Processor 21 comprises an image processor, formatter or raster image processor (RIP), and image engine controller 17 comprises a print engine control computer in exemplary embodiments.

Imaging circuitry 42 is configured to form images (e.g., print images upon media in the described printer application). Imaging circuitry 42 includes electromechanical loads in the illustrated configuration. For example, such can include motors, solenoids, fans, clutches, etc. (not shown), for implementing imaging operations within image forming device 2. Imaging circuitry 42 includes an image engine 18, an input tray 19, and an output and finishing tray 20 in the illustrated configuration. Logic circuitry 40 and imaging circuitry 42 can include more or less components in other arrangements. Imaging circuitry 42 is coupled with a power supply which provides a higher fixed voltage reference, such as 24 Volts.

As described further below, image forming device 2 is configured to operate in one of a plurality of operational modes. One exemplary operational mode includes a normal operational mode wherein image forming device 2 can image (e.g., print) text or illustrations upon media. Another exemplary operational mode is a power save mode. Image forming device 2 enters such power save mode to conserve power during periods of inactivity. Logic circuitry 40 of the electrical circuitry controls operational modes of image forming device 2 as discussed further below.

An exemplary processor 21 is available from Advanced Micro Devices, Inc. under a product designation 29040. Processor 21 communicates with other hardware elements of image forming device 2 via bus 15.

I/O port 16 comprises an input/output device adapted to couple with host computer 1. I/O port 16 comprises a parallel interface which provides communications between image forming device 2 and host computer 1 in the described arrangement. I/O port 16 receives page description language data from host computer 1 for processing within image forming device 2 in accordance with the described embodiment. More specifically, data to be imaged is applied from host computer 1 to image forming device 2 via I/O port 16.

Image engine controller 17 and associated image engine 18 provide image output capability for image forming device 2. Image engine 18 is connected directly to bus 15 in other arrangements. An exemplary image engine controller 17 may be implemented as microcontroller, such as an H8 controller available from Hitachi, Ltd. Image engine 18 is configured to form an image corresponding to the received data. In the described printer embodiment, image engine 18 is a print engine configured to print images corresponding to the received data upon media. An exemplary image engine 18 includes a developer assembly, etc.

Sheet media is pulled from input tray 19 into image engine 18 and subsequently directed to output and finishing tray 20 in the described configuration. Output and finishing tray 20 includes, in an exemplary embodiment, finishing feature mechanisms such as sheet registration, binding, stapling, punching, and the like, and may include one or more bins for collation or "mailbox" usage purposes. Input tray 19 may also include a plurality of input trays for varied media selection.

According to the described embodiment, image engine 18 is a multi-resolution capable engine. For example, it can print, selectively, at 600 or 1200 dots per inch (dpi). For purposes of this disclosure, image engine 18 is a laser arrangement that employs an electrophotographic drum imaging system. Other image forming systems are utilized in other configurations.

Storage device 13 provides main memory storage capabilities within image forming device 2 for storing print job data streams received from host computer 1. Further, storage device 13 is utilized to store processed data within image forming device 2. Storage device 13 may be referred to herein as mass storage memory.

Storage device 13 comprises a Read Only Memory (ROM) device configured to store firmware which defines the operation of processor 21 and controls image forming device 2. Exemplary firmware code stored in the storage device includes an input/output (I/O) subsystem, an imaging subsystem, and an engine subsystem.

Figure 4:
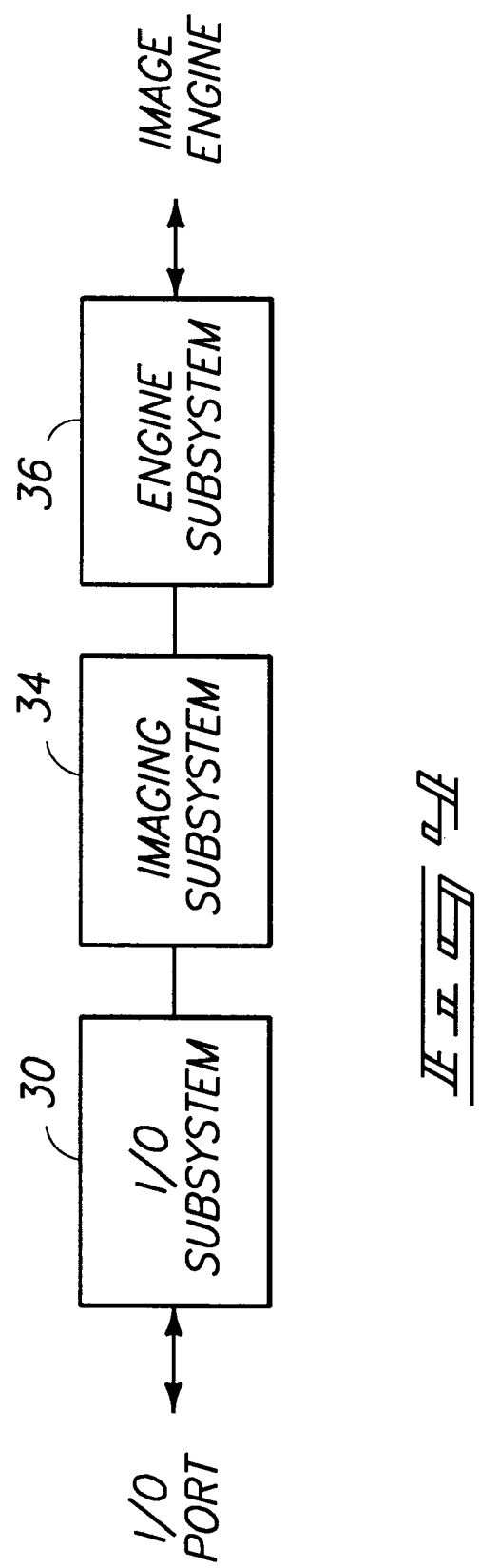
FIG. 4 is a functional block diagram of exemplary firmware of the imaging forming device.

Referring to FIG. 4, firmware subsystems of image forming device 2 are illustrated. The firmware of the exemplary image forming device 2 provides an I/O subsystem 30, an imaging subsystem 34, and an engine subsystem 36.

I/O subsystem 30 is operable to accept inbound data received from I/O port 16 and prepare outbound data for communication via I/O port 16. I/O subsystem 30 is configured to strip I/O specific data from received data and pass the remaining data (e.g., page description language) to imaging subsystem 34.

In general, the operation of image forming device 2 commences responsive to the reception of page description data from host computer 1 via I/O port 16 in the form of a print job data stream. The page description data is initially placed in storage device 13. Processor 21 accesses the page description language and performs initial operations, if any.

Thereafter, processor 21 builds a display command list using imaging subsystem 34. Imaging subsystem 34 contains a parser and rasterizer (not shown) configured to respectively parse and rasterize a data stream, including original data and edit data, to be printed.

In particular, imaging subsystem 34 is configured in the described arrangement to process received data to convert page description language data received from host computer 1 to a display command list. Individual display commands define an object to be printed on a page. Rasterizer firmware of imaging subsystem 34 is configured to convert individual display commands to an appropriate bit map (rasterized strip) and distribute the bit map into storage device 13. Compression firmware may be provided in some configurations to compress the rasterized strips.

The rasterized data may be retrieved from storage device 13 by engine subsystem 36. Engine subsystem 36 interfaces with image engine controller 17 and image engine 18 to provide the rasterized data upon the media. Rasterized strips of data are passed to image engine 18 by image engine controller 17 thereby enabling the generation of an image (i.e., text, graphics, etc.) when a page is closed for processing (i.e., all strips have been evaluated, rasterized, compressed, etc.). Engine subsystem 36 controls the sequencing and transferring of page strips to image engine controller 17.

While a print job is being prepared for printing, processor 21 instructs engine controller 17 to prepare image engine 18 for printing. For example, engine controller 17 turns on laser scanners of a development assembly, heaters of a fuser assembly, and various motors of image engine 18 (the specific assemblies and motors are not shown). When appropriate, engine controller 17 indicates to processor 21 that it is ready for reception of image data. Thereafter, processor 21 applies raster image data to engine controller 17. The image data typically comprises pulse width modulated signals for gray scale printing, or binary data for pixel printing, for example. Image engine 18 subsequently images the data upon media from input tray 19 and outputs imaged media to output tray 20.

Figure 5:
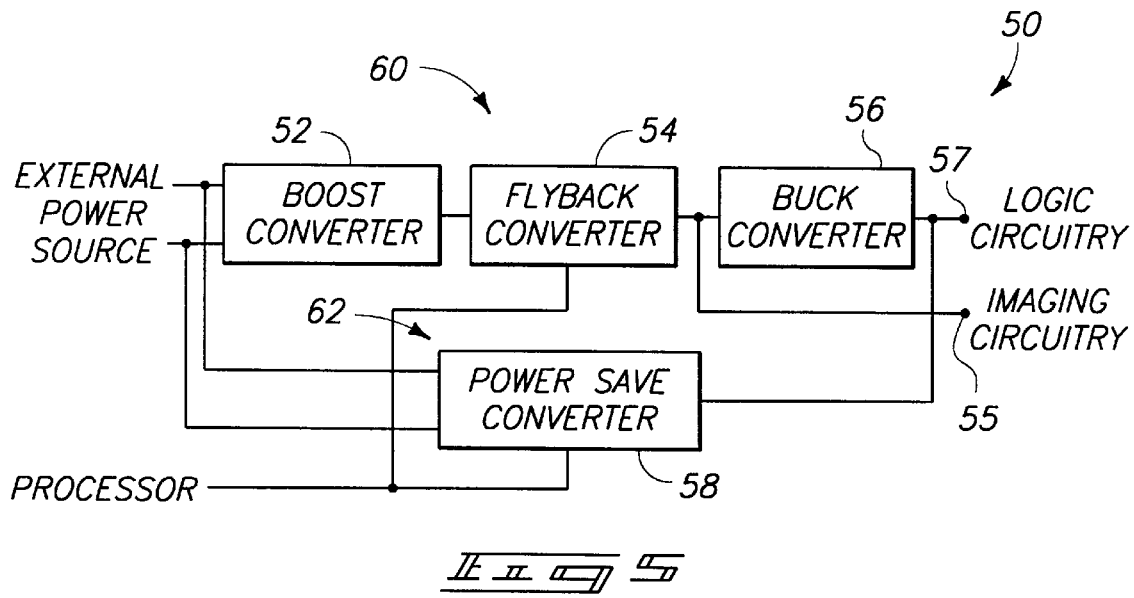
FIG. 5 is a functional block diagram illustrating a first exemplary power supply configuration of the image forming device.
Figure 6:
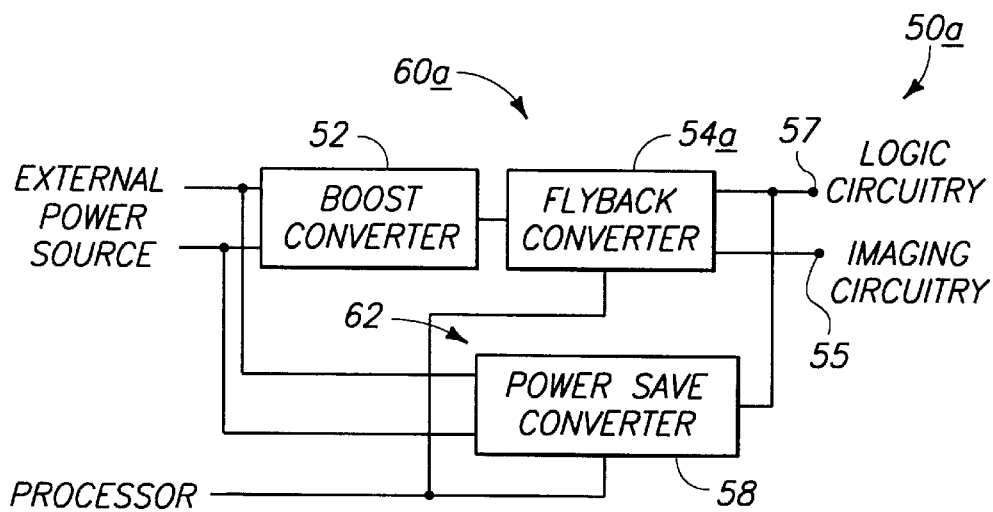
FIG. 6 is a functional block diagram illustrating a second exemplary power supply configuration of the image forming device.

Referring to FIG. 5 and FIG. 6, exemplary power supply configurations 50, 50a of image forming device 2 are shown.

Referring initially to FIG. 5, a first power supply configuration 50 includes a boost converter 52, a flyback converter 54, a buck converter 56 and a power save converter 58. In general, flyback converter 54 is configured to provide power for imaging circuitry 42 of image forming device 2. Buck converter 56 is configured to provide power for logic circuitry 40 of image forming device 2.

As illustrated, boost converter 52 is configured to couple with an external power source, such as AC power line from a local utility. During the normal mode of operation, boost converter 52 operates as a power factor converter and provides AC-to-DC conversion operations. In an exemplary configuration, boost converter 52 outputs high-level DC power at approximately 400 Volts. Flyback converter 54 operates to provide DC voltage conversion from approximately 400 Volts to 24 Volts. A high voltage node 55 (e.g., at 24 Volts) is provided for imaging circuitry 42 as well as buck converter 56. Imaging circuitry 42 is coupled with flyback converter 54 and node 55 to receive the 24 volt power.

Buck converter 56 is operable to provide further DC voltage conversion operations. For example, in the described configuration, buck converter 56 is configured to provide a low voltage node 57 (e.g., at 5 Volts). Logic circuitry 40 is configured to couple with buck converter 56 and node 57 to receive the 5 Volt power in the described embodiment.

Power save converter 58 is coupled with the external power source and logic circuitry 40 of image forming device 2. Processor 21 is coupled with flyback converter 54 and power save converter 58 and is configured to issue commands to converters 54, 58 as described further below.

As indicated above, image forming device 2 is configured to operate in plural operational modes. During the normal operational mode, image forming device 2 is able to form images upon media in accordance with the described embodiment. Additionally, image forming device 2 selectively enters the power save mode of operation to conserve power and to improve efficiency. Such power save mode is entered responsive to issuance of a command from a user, detection of a predefined period of inactivity, etc.

In the described embodiment, power is not applied to imaging circuitry 42 of image forming device 2 during the power save mode of operation. However, power is applied to logic circuitry 40 during the power save mode of operations. Provision of power to logic circuitry 40 enables image forming device 2 to monitor for the reception of data or other activity, and to enter the normal operational mode responsive to the detection of a print job or such other activity.

Power save converter 58 is configured to couple external power source with the logic circuitry power node 57. Power save converter 58 selectively provides 5 Volt power in the described embodiment to node 57 and logic circuitry 40. Converters 52, 54, 56 and 58 can be configured to provide other voltage levels in other configurations.

Flyback converter 54 provides a first power supply 60 of image forming device 2 in the described configuration. Power save converter 58 provides a second power supply 62 of image forming device 2. Individual power supplies 60, 62 are configured to couple with the external power source. Individual power supplies 60, 62 are further configured to supply power to at least one of logic circuitry 40 and imaging circuitry 42.

In the illustrated configuration, first power supply 60 comprises a high power, medium efficiency converter and second power supply 62 comprises a low power, high efficiency converter.

Such a power supply 60 operates to provide 24 Volts to node 55 in the described embodiment. The efficiency of first power supply 60 approaches approximately 80% during operation of image forming device 2 in the normal operational mode but falls to approximately 50% during operation in the power save operational mode. The above-disclosed power supply 62 provides power at a lower voltage of approximately 5 Volts at an approximate efficiency of 95%.

In the described arrangement, the electrical circuitry operates to utilize first power supply 60 to provide power within image forming device 2 during operation in the normal operational mode and to utilize second power supply 62 during operation in the power save operational mode.

In the depicted arrangement of power supply configuration 50, processor 21 issues commands to turn on first power supply 60 and turn off second power supply during the provision of image forming device 2 in the normal mode of operation to form images. Alternatively, processor 21 issues commands to turn off first power supply 60 and to turn on second power supply 62 during operation of image forming device 2 in the power save mode of operation.

In an alternative embodiment, power supply 62 is arranged to operate responsive to the operation of power supply 60. If no voltage is observed at low voltage node 57, power save converter 62 turns on responsive to power supply 60 being off. Thereafter, once power supply 60 is provided on by processor 21, and as indicated by the supply of power to low voltage node 57, power supply 62 again enters an off state corresponding to operation in the normal operational mode of image forming device 2.

Referring to FIG. 6, another power supply configuration 50a is illustrated. Like numerals herein represent like components and variations of such components are represented by a suffix "a".

Power supply 60a of power supply configuration 50a includes a flyback converter 54a having dual outputs. Flyback converter 54a is operable to provide plural output voltage levels from a single input voltage level. For example, flyback converter 54a provides 24 Volt power to node 55 and imaging circuitry 42, and 5 Volt power to node 57 and logic circuitry 40.

Power save converter 58 of power supply 62 is coupled with low voltage node 57 coupled with logic circuitry 40. Processor 21 controls the operation of image forming device 2 in the normal mode of operation and the power save mode of operation. More specifically, processor 21 controls power supplies 60a, 62 to operate in response to the operational mode of image forming device 2. In the described embodiment, processor 21 controls power supply 60a to supply power during the normal mode of operation, and controls power supply 62 to provide power during the power save mode of operation similar to the described operation of power supply configuration 50.

Figure 7:
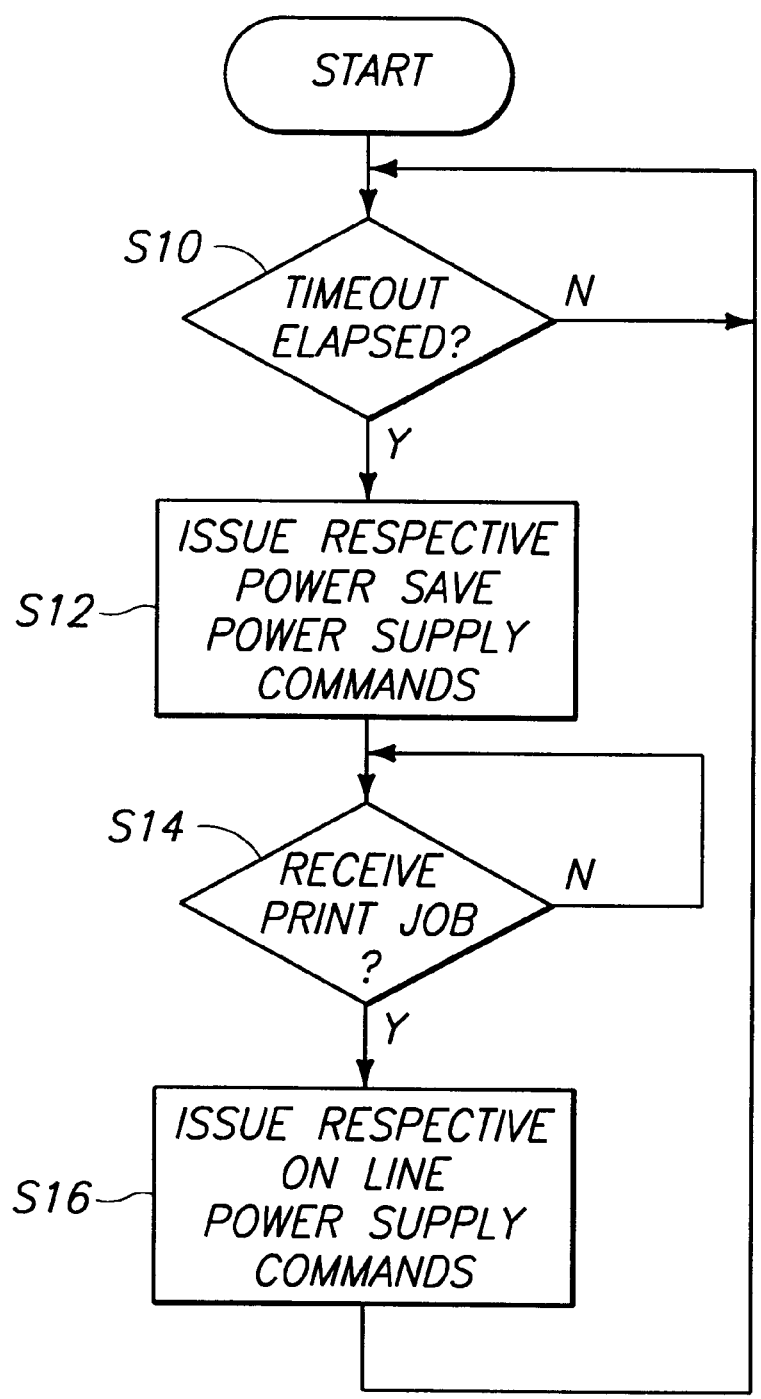
FIG. 7 is a flow chart illustrating exemplary power save operations of the image forming device.

Referring to FIG. 7, power supply control via processor 21 in accordance with one exemplary methodology is described. Other criteria than that described below is utilized to control the operational mode of image forming device 2 according to other aspects of the present invention. The depicted methodology is implemented as executable code provided within storage device 13 in accordance with one embodiment of the invention.

Initially, processor 21 determines at step S10 whether a time-out period has elapsed. Such is typically due to the inactivity of image forming device 2. Following the completion of a print job, processor 21 counts a programmable period of time to determine the activity of image forming device 2. If a subsequent print job is received or other image forming device operation occurs, processor 21 ceases counting the time-out period and awaits another period of inactivity to restart counting of the time-out period. If the time-out period is counted in full by processor 21 at step S10, processor 21 proceeds to step S12.

At step S12, processor 21 issues respective power save power supply commands to respective power supplies 60, 62. More specifically, an "off" command is issued to power supply 60 (power supply 60a for power supply configuration 50a) comprising flyback converter 54, and an "on" command is issued to power supply 62 comprising power save converter 58. Following the issuance of such power save power supply commands, processor 21 proceeds to step S14.

Processor 21 monitors for the presence of a print job at step S14 as received by I/O port 16. Processor 21 maintains image forming device 2 in the power save mode until an appropriate print job is received as indicated at step S14. Step S14 is exemplary. Alternatively, processor 21 can also be configured to monitor for the reception of user inputted commands or for the occurrence of other activity to control operation of image forming device 2. Following the occurrence of an appropriate event, processor 21 proceeds to step S16.

Processor 21 issues respective on-line power supply commands at step S16. In particular, processor 21 issues an "on" command to power supply 60 and issues an "off" command to power supply 62. Following the execution of step S16, processor 21 performs the appropriate print job operations or other operations, and subsequently returns to step S10 to again monitor periods of inactivity or other events.

The protection sought is not to be limited to the disclosed embodiments, which are given by way of example only, but instead is to be limited only by the scope of the appended claims.

What is claimed is:

1. An image forming device comprising:
   an input adapted to couple with an external power source;
   electrical circuitry configured to provide images;
   a first power supply coupled with the input and configured to supply electricity from the input to the electrical circuitry; and
   a second power supply coupled with the input and configured to supply electricity from the input to the electrical circuitry;
   wherein the electrical circuitry includes logic circuitry, and the electrical circuitry is configured to selectively control the supply of electricity from the first power supply and the second power supply to the logic circuitry, wherein the electrical circuitry configured to control only one of the first power supply and the second power supply to supply the electricity to the electrical circuitry at any given moment in time.

2. The device according to claim 1 wherein the first power supply comprises a high power converter and the second power supply comprises a low power converter.

3. The device according to claim 1 wherein the image forming device is configured to operate in a power save mode and the electrical circuitry is configured to control the first power supply and the second power supply to supply electricity only from the second power supply during operation in the power save mode.

4. The device according to claim 1 wherein the electrical circuitry includes imaging circuitry, and the first power supply is coupled to supply electricity to the imaging circuitry and the logic circuitry during a normal operational mode, and the second power supply is coupled to supply electricity to the logic circuitry during a power save mode.

5. The device according to claim 1 wherein the electrical circuitry is configured to control the first power supply to supply electricity to the logic circuitry during a normal operational mode and to control the second power supply to supply electricity to the logic circuitry during a power save mode of operation.

6. The device according to claim 1 wherein the electrical circuitry includes a print engine configured to print images upon media.

7. An image forming method comprising:

provided an image forming device including electrical circuitry;

forming an image using the electrical circuitry;

receiving electricity from an external power source within the image forming device;

supplying the electricity to logic circuitry of the electrical circuitry using a first power supply and a second power supply; and selectively controlling the supplying via the first power supply and the second power supply, wherein the controlling comprises controlling to supply electricity using only one of the first power supply and the second power supply at any given moment in time.

8. The method according to claim 7 wherein the supplying comprises supplying using the first power supply and the second power supply respectively comprising a high power converter and a low power converter.

9. The method according to claim 7 further comprising selectively operating the image forming device in a power save mode and wherein the supplying comprises supplying using only the second power supply during the operating in the power save mode.

10. The method according to claim 7 wherein the supplying comprises supplying to the logic circuitry and to the imaging circuitry of the electrical circuitry using the first power supply during a normal operational mode, and supplying to logic circuitry of the electrical circuitry using the second power supply during a power save mode.

11. The method according to claim 7 further wherein the controlling comprises controlling the first power supply to supply electricity to the logic circuitry during a normal operational mode and controlling the second power supply to supply electricity during a power save mode of operation.

12. The method according to claim 7 wherein the forming comprises printing images upon media.

13. A method of supplying power to an image forming device comprising:

providing an image forming device having electrical circuitry configured to provide images, an input adapted to couple with an external power source, and a first power supply and a second power supply individually coupled with the input and the electrical circuitry;

operating the image forming device in a plurality of operational modes;

first supplying electricity to logic circuitry of the electrical circuitry using only the first power supply during operating in one of the operational modes; and second supplying electricity to the logic circuitry of the electrical circuitry using only the second power supply during operating in another of the operational modes.

14. The method according to claim 13 wherein the supplyings comprise supplyings using the first power supply and the second power supply respectively comprising a high power converter and a low power converter.

15. The method according to claim 13 wherein the first supplying comprises supplying during operating within a normal operational mode, and the second supplying comprises supplying during operating within a power save mode.

16. The method according to claim 13 wherein the first supplying comprises supplying to imaging circuitry and the logical circuitry of the electrical circuitry, and the second supplying comprises only supplying to the logic circuitry.

17. The method according to claim 13 further comprising controlling the supplyings responsive to the operating.

18. The method according to claim 13 wherein the providing comprises providing an image forming device having a print engine.

* * * * *